(12) United States Patent
Hu et al.

(10) Patent No.: US 9,501,680 B2
(45) Date of Patent: Nov. 22, 2016

(54) METHOD AND DEVICE FOR BATCH SCANNING 2D BARCODES

(71) Applicant: TENCENT TECHNOLOGY (SHENZHEN) COMPANY LIMITED, Shenzhen (CN)

(72) Inventors: Bo Hu, Shenzhen (CN); Xi Wang, Shenzhen (CN); Kai Zhang, Shenzhen (CN); Ruiyi Zhou, Shenzhen (CN); Zhengkai Xie, Shenzhen (CN); Bosen He, Shenzhen (CN); Huijiao Yang, Shenzhen (CN); Ying Huang, Shenzhen (CN); Yulei Liu, Shenzhen (CN); Wei Li, Shenzhen (CN); Cheng Feng, Shenzhen (CN); Tingyong Tang, Shenzhen (CN); Sha Mo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 14/103,867

(22) Filed: Dec. 12, 2013

(65) Prior Publication Data
US 2014/0097246 A1  Apr. 10, 2014

Related U.S. Application Data

(63) Continuation of application No. PCT/CN2013/083581, filed on Sep. 16, 2013.

(30) Foreign Application Priority Data

Sep. 19, 2012 (CN) .......................... 2012 1 0349051

(51) Int. Cl.
*G06K 7/14* (2006.01)
*G06K 19/06* (2006.01)

(52) U.S. Cl.
CPC ........... *G06K 7/1443* (2013.01); *G06K 7/1417* (2013.01); *G06K 19/06037* (2013.01)

(58) Field of Classification Search
CPC .... G06K 7/1443; G06K 7/1456; G06K 7/14; G06K 19/06037; G06F 11/08; G06F 11/1608
See application file for complete search history.

(56) References Cited

U.S. PATENT DOCUMENTS

| | | | |
|---|---|---|---|
| 5,481,098 A | 1/1996 | Davis et al. | |
| 2004/0099741 A1* | 5/2004 | Dorai et al. | 235/462.08 |

(Continued)

FOREIGN PATENT DOCUMENTS

| | | |
|---|---|---|
| CN | 1700238 A | 11/2005 |
| CN | 101419669 A | 4/2009 |

(Continued)

OTHER PUBLICATIONS

Changnian Zhang, A 2D Barcode Recognition System Based on Image Processing, College of Information Engineering, North China University of Technology, vol. 98, 2011.*
The World Intellectual Property Organization (WIPO) International Search Report for PCT/CN2013/083581 Dec. 19, 2013.

*Primary Examiner* — Sonji Johnson
(74) *Attorney, Agent, or Firm* — Anova Law Group, PLLC

(57) ABSTRACT

Methods and devices for batch scanning 2D barcodes are provided by using a 2D barcode positioning process to determine a barcode area corresponding to each 2D barcode of a plurality of 2D barcodes in an image. According to the barcode area corresponding to each 2D barcode, the image containing the plurality of 2D barcodes can be segmented to provide a plurality of 2D barcode images with each barcode image corresponding to one 2D barcode of the plurality of 2D barcodes. Each barcode image of the plurality of 2D barcode images corresponding to the plurality of 2D barcodes can be decoded to obtain data contained in each barcode image. An exemplary device can include a positioning module, a segmenting module, and a decoding module.

15 Claims, 4 Drawing Sheets

(56) References Cited

U.S. PATENT DOCUMENTS

2006/0266836 A1* 11/2006 Bilcu ............... G06T 7/004 235/462.16
2009/0108080 A1 4/2009 Meyer et al.
2012/0048937 A1* 3/2012 Dahari ............... 235/462.08
2014/0138442 A1* 5/2014 Wang ............... G06K 7/146 235/462.41

FOREIGN PATENT DOCUMENTS

| CN | 101882211 A | 11/2010 |
| CN | 102446264 A | 5/2012 |
| CN | 102880850 A | 1/2013 |

* cited by examiner

A. Original image  B. Binarized image  C. Dilated image  D. Image after edge detection A. QR-CODE positioning pattern B: MAXICODE positioning pattern C. DATAMATRIX positioning pattern

METHOD AND DEVICE FOR BATCH SCANNING 2D BARCODES

CROSS-REFERENCES TO RELATED APPLICATIONS

This application is a continuation application of PCT Patent Application No. PCT/CN2013/083581, filed on Sep. 16, 2013, which claims priority to Chinese Patent Application No. CN201210349051.6, filed on Sep. 19, 2012, the entire contents of all of which are incorporated herein by reference.

FIELD OF THE DISCLOSURE

The present disclosure relates to the field of computer applications and, more particularly, relates to methods and devices for batch scanning two-dimensional (2D) barcodes.

BACKGROUND

With rapid development of mobile Internet and growing popularity of smart phones, more and more important information is carried by 2D barcodes. Scanning 2D barcodes to read information becomes an important method for obtaining information.

2D barcode is a coding scheme based on traditional bar code. After error correction to code the characters, text, images and other information, the resulting binary code stream may be expressed as 2D barcode symbols. Compared with traditional one-dimensional code, 2D barcode may have high information capacity and error correction ability, which does not rely on database support. 2D barcode is widely used in document recognition and reading, logistics, electronic data exchange, etc.

Currently, scanning devices that have a function to read and parse 2D barcodes can scan the 2D barcodes. By identifying binary data recorded as a length and width of the barcode, information contained therein may be obtained.

Conventionally, scanning of 2D barcodes is performed in a manner that after a scanning of a first 2D barcode, another scanning of a second 2D barcode is followed. The user uses a scanning device that can scan and read a 2D barcode and align its camera with the 2D barcode for the scanning. After a successful scanning, the scanning device can read information from the first scanned 2D barcode. After reading this information, the scanning device is then switched back to a scanning interface to scan the second 2D barcode. This switching process can be repeated as needed to scan a batch of barcodes. When a large number of 2D barcodes needs to be scanned, scanning such batch of 2D barcodes in a manner of one after another is complicated, time-consuming, and inefficient.

BRIEF SUMMARY OF THE DISCLOSURE

According to various embodiments, there is provided a method for batch scanning 2D barcodes by using a 2D barcode positioning process to determine a barcode area corresponding to each 2D barcode of a plurality of 2D barcodes in an image. According to the barcode area corresponding to each 2D barcode, the image containing the plurality of 2D barcodes can be segmented to obtain a plurality of 2D barcode images with each barcode image corresponding to a 2D barcode of the plurality of 2D barcodes. Each barcode image of the plurality of 2D barcode images can be decoded to obtain data contained in each barcode image of the plurality of 2D barcode images corresponding to the plurality of 2D barcodes.

According to various embodiments, there is also provided a device for batch scanning 2D barcodes. The device can include a positioning module, a segmenting module, and a decoding module. The positioning module can be configured to use a 2D barcode positioning process to determine a barcode area corresponding to each 2D barcode of a plurality of 2D barcodes in an image. The segmenting module can be configured to segment the image containing the plurality of 2D barcodes to obtain a plurality of 2D barcode images with each barcode image corresponding to one 2D barcode of the plurality of 2D barcodes, after the positioning module determines the barcode area and according to the barcode area corresponding to each 2D barcode. The decoding module can be configured to decode each barcode image of the plurality of 2D barcode images corresponding to the plurality of 2D barcodes to obtain data contained in each barcode image of the plurality of 2D barcode images, after the segmenting module obtains the plurality of 2D barcode images.

Another aspect of the present disclosure includes a non-transitory computer-readable medium having computer program. When being executed by a processor, the computer program performs a method for batch scanning 2D barcodes. The method includes using a 2D barcode positioning process to determine a barcode area corresponding to each 2D barcode of a plurality of 2D barcodes in an image. The method also includes segmenting the image containing the plurality of 2D barcodes to obtain a plurality of barcode images with each barcode image corresponding to a 2D barcode of the plurality of 2D barcodes, according to the barcode area corresponding to the each 2D barcode. Further, the method includes decoding the each barcode image of the plurality of barcode images corresponding to the plurality of 2D barcodes to obtain data contained in the each barcode image.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods and devices for batch scanning 2D barcodes are provided to implement batch scanning and recognition of 2D barcodes. The disclosed methods and devices can effectively simplify the batch scanning process of 2D barcodes to save operation time, and enhance the scanning efficiency.

Figure 1:
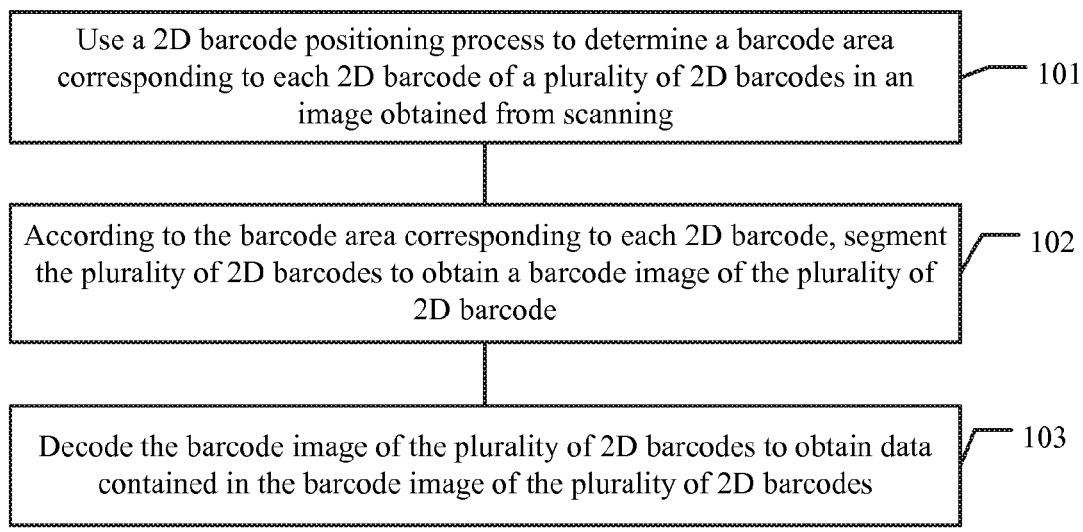
FIG. 1 depicts an exemplary method for batch scanning 2D barcodes in accordance with various disclosed embodiments.

FIG. 1 depicts an exemplary method for batch scanning 2D barcodes in accordance with various disclosed embodiments. The exemplary method may be carried out by a scanning device with computation capabilities. The scanning device may include one or more processors, memory, and a plurality of program modules stored in the memory and configured to implement various functionalities such as image processing. In some embodiments, the scanning device may include a camera. The camera may capture an image containing a plurality of barcodes for further processing.

In Step 101, a 2D barcode positioning process is used to determine a barcode area corresponding to each 2D barcode of a plurality of 2D barcodes in an image.

The image can be any image, for example, obtained from scanning, and/or selected from a photo gallery, a photo album, and/or a photo stream. Although the present disclosure is described using an image obtained from scanning as an example, one of ordinary skill in the art would understand that the disclosed methods and devices can be performed in regard to any image without limitation.

In one embodiment, the user may align a camera of a scanning device with the plurality of 2D barcodes that are pre-arranged to capture an image. The image can therefore be obtained in the scanning device. For example, the scanning device can use the 2D barcode positioning process to determine a barcode area corresponding to each 2D barcode of the plurality of 2D barcodes in the image obtained from scanning. In an exemplary embodiment where the scanned image contains five 2D barcodes, the scanning device can determine the barcode area in the image corresponding to each of the five 2D barcodes.

In Step 102, according to the barcode area corresponding to each 2D barcode, the image containing the plurality of 2D barcodes is segmented to provide a plurality of 2D barcode images with each barcode image corresponding to one 2D barcode of the plurality of 2D barcodes.

In various embodiments, after the scanning device determines the barcode area corresponding to each 2D barcode, according to the barcode area corresponding to each 2D barcode, the scanning device can sequentially segment the image containing the plurality of 2D barcodes to obtain a plurality of barcode images of the 2D barcodes. For example, if the image scanning device determines the barcode area corresponding to each of the five 2D barcodes in an image, the scanning device can sequentially segment the 2D barcodes according to the barcode area corresponding to each of the five 2D barcodes and obtain barcode images corresponding to the five 2D barcodes.

In Step 103, each barcode image of the plurality of 2D barcode images is decoded to obtain data contained in each barcode image of the plurality of 2D barcode images corresponding to the plurality of 2D barcodes.

In one embodiment, after obtaining the barcode images, the scanning device can sequentially decode each barcode image of the plurality of 2D barcode images to obtain data contained in each barcode image. For example, if the scanning device obtains barcode images corresponding to five 2D barcodes, the scanning device can sequentially decode each barcode image of the five 2D barcode images to obtain data contained in each barcode image.

As disclosed herein, by using the 2D barcode positioning process to determine a barcode area corresponding to each 2D barcode of a plurality of 2D barcodes, the image containing the plurality of 2D barcodes can be sequentially segmented to obtain a plurality of 2D barcode images. Each barcode image of the plurality of 2D barcode images corresponding to the 2D barcodes can be decoded to obtain data contained in each barcode image of the plurality of 2D barcodes. This effectively realizes batch scanning and recognition of a plurality of 2D barcodes and simplifies scanning and recognition operations of 2D barcodes. This also saves operation time and increases operation efficiency.

Figure 2:
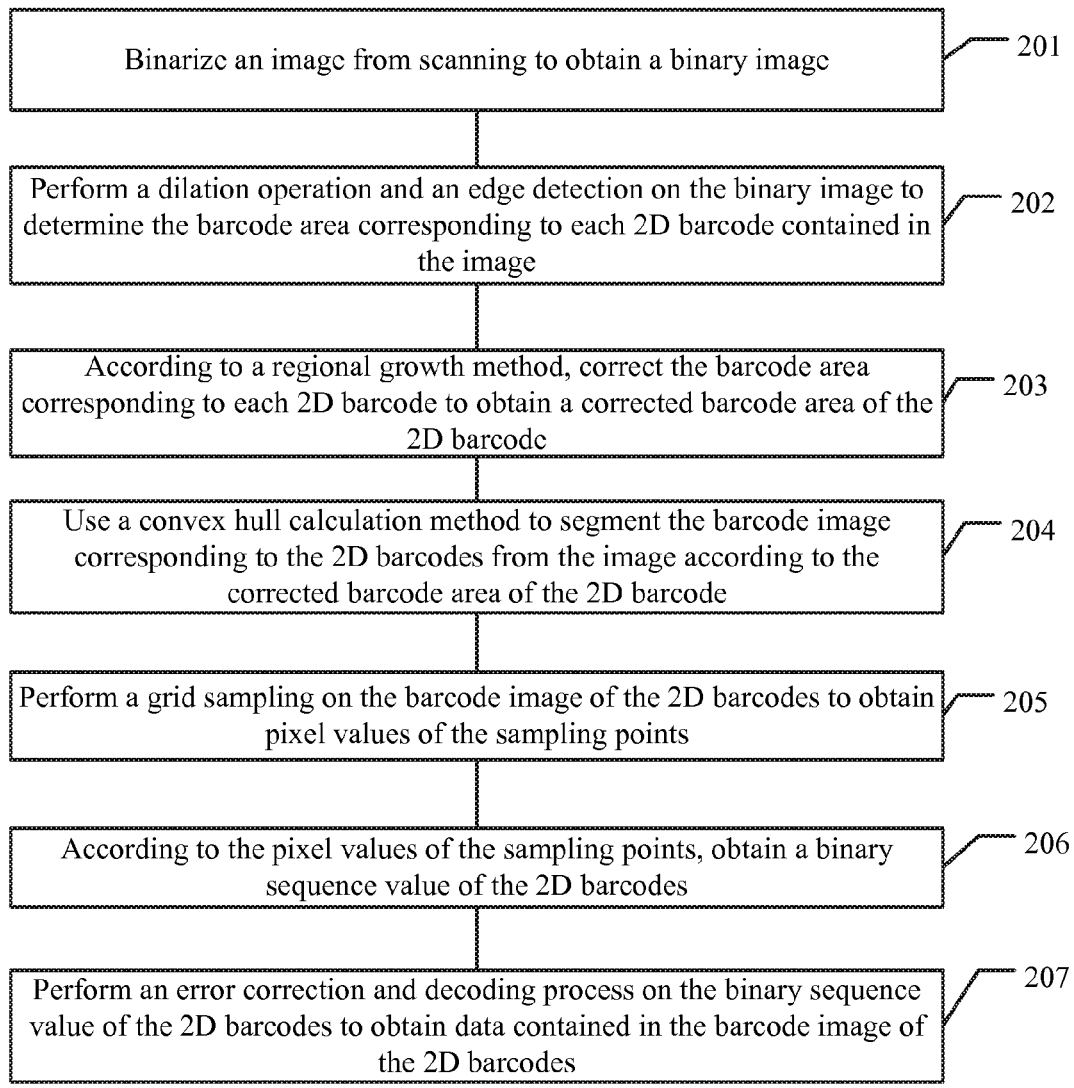
FIG. 2 depicts another exemplary method for batch scanning 2D barcodes in accordance with various disclosed embodiments.

FIG. 2 depicts an exemplary method for batch scanning 2D barcodes in accordance with various disclosed embodiments. The exemplary method may be carried out by a scanning device with computation capabilities. The scanning device may include one or more processors, memory, and a plurality of program modules stored in the memory and configured to implement various functionalities such as image processing. In some embodiments, the scanning device may include a camera. The camera may capture an image containing a plurality of barcodes for further processing.

In Step 201, an image, e.g., from scanning, is binarized to provide a binary image.

In one embodiment, the user can align a camera of a scanning device with a plurality of 2D barcodes according to a predetermined arrangement to sort the image, such that the scanning device obtains barcode images of the plurality of 2D barcodes. In addition, the scanning device can binarize the image from scanning to obtain a binary image. Such binarizing process refers to a process to set a gray value of the pixel to be about 0 or about 255, such that the entire image has a clear black and white effect.

For example, the binarizing process can be carried out using the following formula:

$$g(x, y) = \begin{cases} 255, & f(x, y) \geq T \\ 0, & f(x, y) < T \end{cases} \quad \text{formula (1)}$$

Where f (x, y) is a gray value of pixel (x, y), g (x, y) is a binarized value of the pixel (x, y), and T is a pre-set gray value.

In Step 202, a dilation operation and an edge detection are performed on the binary image to determine a barcode area corresponding to each 2D barcode contained in the image.

For example, after binarizing the image from scanning to obtain a binary image, the scanning device can perform a dilation operation and an edge detection on the binary image to determine the barcode area corresponding to each 2D barcode contained in the image.

Figure 3:
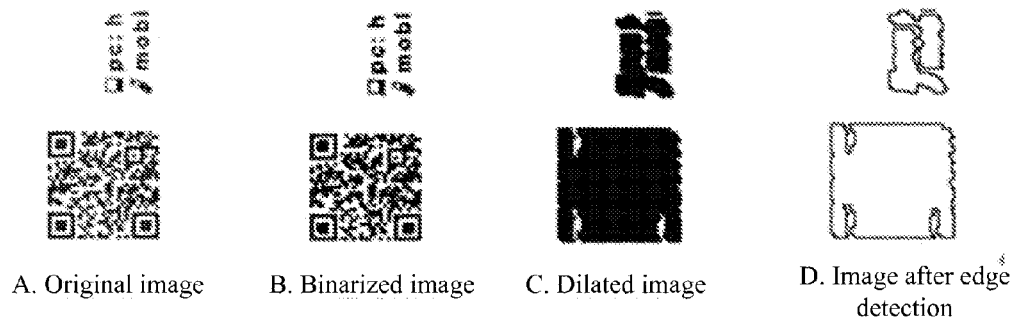
FIG. 3 depicts an image development during an exemplary 2D barcode positioning process in accordance with various disclosed embodiments.

In various embodiments, Step 201 and Step 202 can include a 2D barcode positioning process in the image. FIG. 3 depicts an image development when the image is processed by an exemplary 2D barcode positioning process in accordance with various disclosed embodiments. As shown in FIG. 3, the image development can include development form an original image (i.e., the image from scanning or from other suitable sources), a binarized image, a dilated image, to an image after edge detection.

In one embodiment, the scanning device can further determine the type of the 2D barcode based on the barcode area of the 2D barcode. For example, the scanning device can obtain a positioning pattern contained in the barcode area corresponding to the 2D barcode; and determine the type of the 2D barcode based on the positioning pattern.

Figure 4:
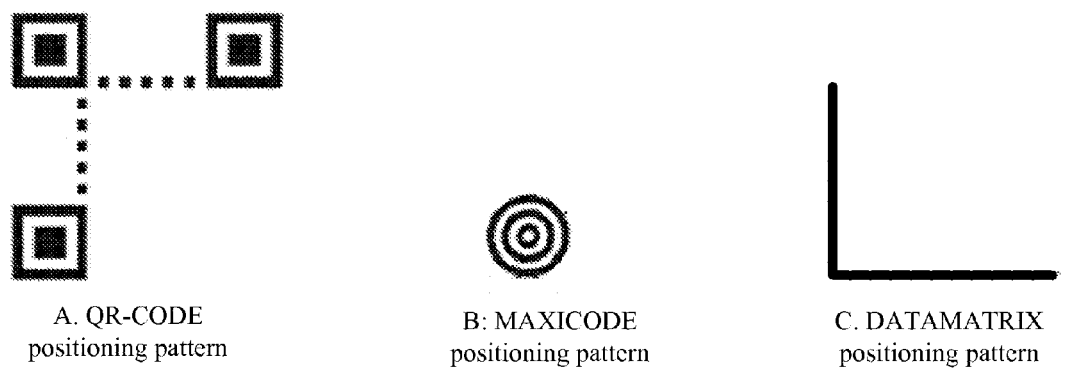
FIG. 4 depicts various exemplary positioning patterns of 2D barcodes in accordance with various disclosed embodiments.

For example, as shown in FIG. 4, an exemplary Matrix 2D barcode can include three types of positioning patterns including a positioning pattern of QR-CODE, MAXICODE, and DATAMATRIX type. The QR-CODE type can include a positioning pattern located respectively in the upper-left corner, bottom-left corner, and upper-right corner of the barcode area. The MAXICODE type can include a positioning pattern having three equally spaced concentric rings located in the center of the barcode area. DATAMATRIX type can include a positioning pattern having two perpendicular solid lines located in adjacent sides of the barcode area.

In one embodiment, the scanning device can obtain the positioning pattern contained in barcode area corresponding to the 2D barcode. In one example, when there are three positioning patterns located respectively in three corners of the barcode area, it is determined that the 2D barcode includes the QR-CODE type. In another example, when the positioning pattern in the barcode area corresponding to the 2D barcode obtained by the scanning device includes three equally spaced concentric rings in the center of the barcode area, it is determined that the 2D barcode includes the MAXICODE type. In still another example, when the positioning pattern in the barcode area corresponding to the 2D barcode obtained by the scanning device includes two perpendicular solid lines, it is determined that the 2D barcode includes the DATAMATRIX type.

In practical applications, a 2D barcode can correspond with the positioning pattern(s) inherently contained in the 2D barcode, and the positioning pattern can be used for determining the type of 2D barcode, such that the type of 2D barcode can be determined according to the positioning pattern(s) in the barcode area corresponding to the 2D barcode.

In Step 203, according to a regional growth method, the barcode area corresponding to each 2D barcode is corrected to obtain a corrected barcode area of the 2D barcode.

In one embodiment, because boundaries of the barcode area are not sufficiently complete after the edge detection, there is a need to perform a boundary correction process to the barcode area of the 2D barcode. Therefore, after determining the barcode area corresponding to each 2D barcode in the image, the scanning device can correct the barcode area corresponding to each 2D barcode according to a regional growth method to obtain a corrected barcode area of the 2D barcode. In one embodiment, when the scanning device applies the regional growth method, one or more seed points may be chosen in the barcode areas obtained from step 202 (e.g., a point at the center of a barcode area). Adjacent points of the seed point may be neighboring points (e.g., 8-connected neighborhood points of the seed point). Starting from the seed points, the scanning device may examine adjacent points of a seed point and determine whether to include the adjacent points to the region based on pixel intensity threshold. For example, when the binarized image is used as the basic image for region growing, if an adjacent point has a pixel intensity at 255, it may be determined to add the adjacent points to the region. If an adjacent point has a pixel intensity at 0, the adjacent point may be excluded from the region. In the next iteration, newly added points may be used as seed points to further grow the region. When the iterations are completed (e.g., no new points are added to the region in one iteration), the obtained region may represent the corrected barcode area.

In Step 204, a convex hull calculation method is used to segment out the barcode images corresponding to the 2D barcodes from the image, according to the corrected barcode area of the 2D barcode.

In one embodiment, after correcting the barcode area of the 2D barcode, the scanning device can use a convex hull calculation method to segment out the barcode images corresponding to the 2D barcodes from the image according to the corrected barcode area of the 2D barcode. The segmenting process of the image containing the 2D barcodes can be performed. Specifically, the corrected barcode area obtained from step 203 includes a set of points. The convex hull method may construct the convex hull from the set of points by first sorting the points lexicographically (first by x-coordinate, and in case of a tie, by y-coordinate), and then constructing upper and lower hulls of the points. Thus, the scanning device may obtain the convex outline shape of the corrected barcode area by implementing the convex hull method. Based on the convex outline shapes of the corrected barcode areas, the scanning device may segment out the plurality of the barcode images.

In Step 205, a grid sampling is performed on each barcode image of the 2D barcode images corresponding to the 2D barcodes to obtain pixel values of the sampling points.

In Step 206, according to the pixel values of the sampling points, a binary sequence value of the 2D barcodes is obtained.

In Step 207, an error correction and a decoding process is performed on the binary sequence value of the 2D barcodes to obtain data contained in each barcode image of the 2D barcode images.

In one embodiment, after the scanning device obtains the barcode image of the 2D barcodes, the scanning device can sequentially decode the barcode image of the plurality of 2D barcodes to obtain data contained in the barcode image of each 2D barcode. For example, the barcode image of the 2D barcodes can be processed as follows.

The scanning device can perform a grid sampling on the barcode image of the 2D barcodes to obtain pixel values of sampling points. The scanning device can then determine whether the pixel values of the sampling points are greater than or equal to a preset pixel value. If a pixel value of the sampling point is greater than the pre-set pixel value, a value corresponding to the sample point is 1. If a pixel value of the sampling point is less than or equal to the pre-set pixel value, a value corresponding to the sample point is 0. In this manner, each pixel value of the sampling point can be determined and the binary sequence value corresponding to the 2D barcodes can be obtained. In addition, the scanning device can perform error correction and decoding of the obtained binary sequence value and obtain data contained in each barcode image of the 2D barcodes.

As disclosed herein, use of image binarizing process, dilation operation, and edge detection can effectively determine that the barcode area corresponding to each 2D barcode is included in the image and can correct the barcode area corresponding to each 2D barcode to obtain a corrected barcode area. The corrected barcode area can be processed by a regional growth method and a convex hull calculation to effectively segment each 2D barcode from the image. Further, a decoding process can be performed on each barcode image of the 2D barcodes. This effectively realizes batch scanning and recognition of a plurality of 2D barcodes and simplifies scanning and recognition operations of 2D barcodes. This also saves operation time and increases operation efficiency.

For better understanding the method depicted in FIG. 2, an exemplary application scenario is provide as the following.

In this example, a user may need to scan four 2D barcodes including, e.g., a 2D barcode A, a 2D barcode B, a 2D barcode C, and a 2D barcode D. The user can arrange the four 2D barcodes in a preset manner (e.g., in two rows with each row having two 2D barcodes). The user can align a camera of the disclosed scanning device with the 2D barcodes to capture an image E. When the scanning device obtain the captured image E, the scanning device can perform a binarizing process on the image E and perform a dilation operation and an edge detection on the binarized image to determine a barcode area corresponding to each 2D barcode in the image E.

The barcode area can include positions of 2D barcode A, 2D barcode B, 2D barcode C, and 2D barcode D in the image E. The scanning device can then correct the barcode area corresponding to 2D barcode A, 2D barcode B, 2D barcode C, and 2D barcode D according to a region growth method and can use a convex hull calculation method to sequentially segment out each barcode image corresponding to the 2D barcode A, 2D barcode B, 2D barcode C, and 2D barcode D from the image according to the corrected barcode area of the 2D barcodes.

Then, the scanning device can sequentially perform a grid sampling on each barcode image of the 2D barcode A, B, C, and D to obtain pixel values of sampling points. According to the pixel values of the sampling points, the scanning device can obtain a binary sequence value of the 2D barcode A, B, C, and D.

Further, the scanning device can perform error correction and decoding of the obtained binary sequence value corresponding to the 2D barcode A, B, C, and D to obtain the data contained in each barcode image of the 2D barcode A, B, C, and D. Batch scanning of 2D barcodes can thus be performed.

Figure 5:
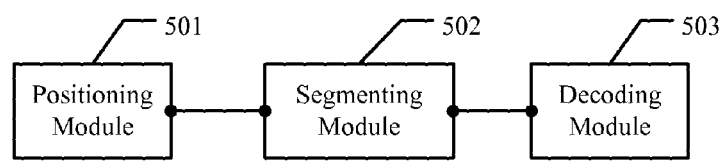
FIG. 5 depicts an exemplary scanning device in accordance with various disclosed embodiments.

FIG. 5 depicts an exemplary scanning device in accordance with various disclosed embodiments. The exemplary scanning device may have computation capabilities, including one or more processors, memory, and a plurality of program modules stored in the memory and configured to implement various functionalities such as image processing. The plurality of program modules can include a positioning module 501, a segmenting module 502, and/or a decoding module 503. In some embodiments, the scanning device may include a camera. The camera may capture an image containing a plurality of barcodes for further processing.

The positioning module 501 is configured to use a 2D barcode positioning process to determine a barcode area corresponding to each 2D barcode of a plurality of 2D barcodes in an image, e.g., obtained from scanning. In one embodiment, the positioning module 501 may be carried out by software programs executed by the processor of the exemplary scanning device. The input of the positioning module 501 may be the image obtained from scanning. The positioning module 501 may implement the 2D barcode positioning process, and output the determined barcode areas corresponding to the plurality of 2D barcodes in the input image.

The segmenting module 502 is configured, after the positioning module 501 determines the barcode area, and according to the barcode area corresponding to each 2D barcode, to sequentially segment the image containing the plurality of 2D barcodes to obtain a plurality of 2D barcode images. In one embodiment, the segmenting module 502 may be carried out by software programs executed by the processor of the exemplary scanning device. The input of the segmenting module 502 may be the barcode areas obtained from the positioning module 501. The segmenting module 502 may sequentially segment the image containing the plurality of 2D barcodes. The segmenting module 502 may output a plurality of 2D barcode images segmented from the input image.

The decoding module 503 is configured, after the segmenting module 502 obtains barcode images corresponding to the 2D barcodes, to sequentially decode each barcode image of the plurality of 2D barcode images to obtain data contained in each barcode image of the plurality of 2D barcodes. In one embodiment, the decoding module 503 may be carried out by software programs executed by the processor of the exemplary scanning device. The input of the decoding module 503 may be the segmented barcode images obtained from the segmenting module 502. The decoding module 503 may sequentially decode each barcode image. The decoding module 502 may output data contained in each barcode image of the plurality of 2D barcodes.

As disclosed, the positioning module 501 in the scanning device 500 uses a 2D barcode positioning process to determine a barcode area corresponding to each 2D barcode of a plurality of 2D barcodes. The segmenting module 502, according to the barcode area corresponding to each 2D barcode, sequentially segments the plurality of 2D barcodes to obtain the plurality of 2D barcode images. The decoding module 503 sequentially decodes each barcode image of the plurality of 2D barcode images to obtain data contained in each barcode image of the plurality of 2D barcode images.

As disclosed herein, by using the 2D barcode positioning process to determine a barcode area corresponding to each 2D barcode of a plurality of 2D barcodes, the plurality of 2D barcodes can be sequentially segmented to obtain the plurality of 2D barcode images. Each barcode image of the plurality of 2D barcode images can be decoded to obtain data contained in each barcode image of the plurality of 2D barcode images. This effectively realizes batch scanning and recognition of a plurality of 2D barcodes and simplifies scanning and recognition operations of 2D barcodes. This also saves operation time and increases operation efficiency.

Figure 6:
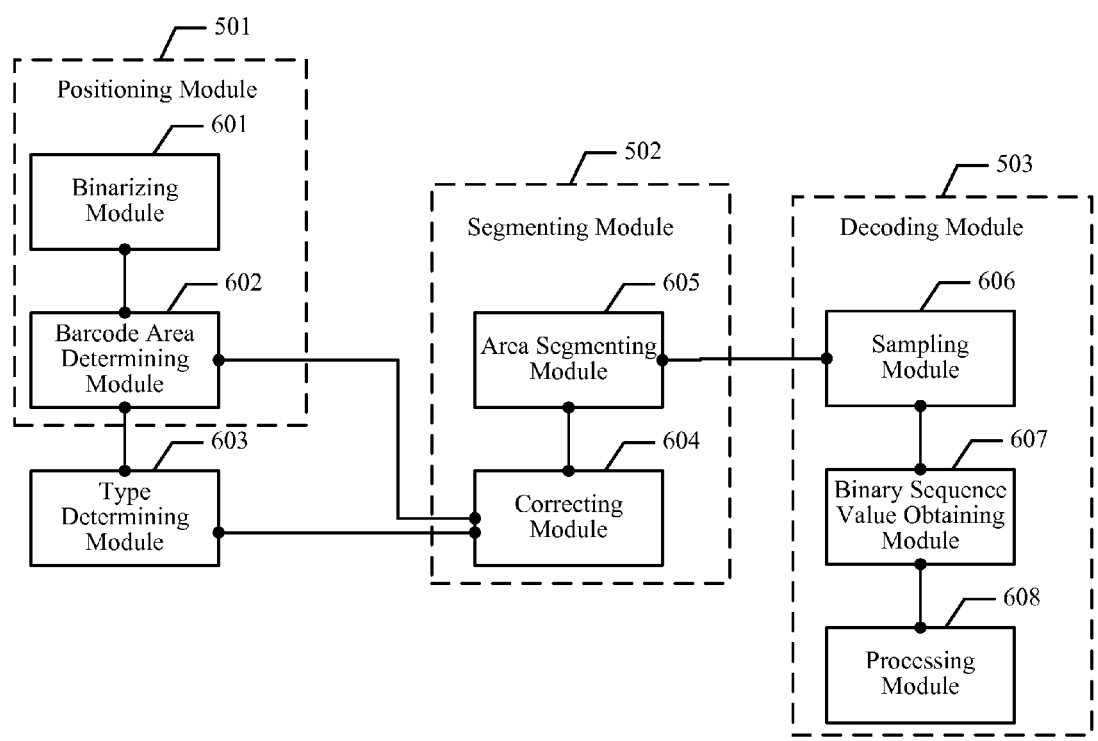
FIG. 6 depicts another exemplary scanning device in accordance with various disclosed embodiments.

FIG. 6 depicts another exemplary scanning device in accordance with various disclosed embodiments. The exemplary scanning device depicted in FIG. 6 may have computation capabilities, including one or more processors, memory, and a plurality of program modules stored in the memory and configured to implement various functionalities such as image processing. The plurality of program modules can also include a positioning module 501, a segmenting module 502, and/or a decoding module 503, as depicted in FIG. 5. In some embodiments, the scanning device may include a camera. The camera may capture an image containing a plurality of barcodes for further processing.

For example, the positioning module 501 in FIG. 6 can include a binarizing module 601, and/or a barcode area determining module 602.

The binarizing module 601 is configured to binarize an image to obtain a binary image. The barcode area determining module 602 is configured, after the binarizing module 601 binarizes the image, to perform a dilation operation and an edge detection on the binary image to determine the barcode area corresponding to each 2D barcode contained in the binary image. In one embodiment, the binarizing module 601 and the barcode area determining module 602 may be carried out by software programs executed by the processor of the exemplary scanning device. The input of the binarizing module 601 may be the image obtained from scanning, and the output of the binarzing module 601 may output the binary image. The input of the barcode area determining module 602 may be the binary image obtained from the binarizing module, and the output of the barcode area determining module 602 may output the determined barcode areas corresponding to the plurality of 2D barcodes.

The exemplary scanning device depicted in FIG. 6 further includes: a type determining module 603. The type determining module 603 is configured to obtain a positioning pattern contained in a barcode area corresponding to each 2D barcode and to determine the type of the 2D barcode based on the positioning pattern. In one embodiment, the type determining module 603 may be carried out by a software executed by the processor of the exemplary scanning device. The input of the type determining module 603 may be the barcode areas obtained from the barcode area determining module 602, and the type determining module 603 may output the determined types of the barcode areas.

The segmenting module 502 in FIG. 6 can include a correcting module 604 and/or an area segmenting module 605.

The correcting module 604 is configured, according to a regional growth method, to correct the barcode area corresponding to each 2D barcode to obtain corrected barcode area of the 2D barcode. In one embodiment, the correcting module 604 may be carried out by software programs executed by the processor of the exemplary scanning device. The input of the correcting module 604 may be the barcode areas obtained from the barcode area determining module 602, and the correcting module 604 may output the corrected barcode areas of the 2D barcodes.

The area segmenting module 605 is configured, after the correcting module 604 obtains the corrected barcode area of the 2D barcode, to use a convex hull calculation method to segment out the barcode images corresponding to the 2D barcodes from the image according to the corrected barcode area of the 2D barcode. In one embodiment, the area segmenting module 605 may be carried out by software programs executed by the processor of the exemplary scanning device. The input of the area segmenting module 605 may be the corrected barcode areas obtained from the correcting module 604, and the area segmenting module 605 may output the segmented barcode images corresponding to the 2D barcodes from the image.

The decoding module 503 in FIG. 6 can also include a sampling module 606, a binary sequence value obtaining module 607, and/or a processing module 608.

The sampling module 606 is configured to perform a grid sampling on each barcode image of the 2D barcode images to obtain pixel values of the sampling points. In one embodiment, the sampling module 606 may be carried out by software programs executed by the processor of the exemplary scanning device. The input of the sampling module 606 may be the barcode images obtained from the area segmenting module 605, and the sampling module 606 may output the pixel values of the sampling points corresponding to the 2D barcodes images.

The binary sequence value obtaining module 607 is configured, after the sampling module 606 obtains the pixel values of the sampling points, according to the pixel values of sampling points, to obtain a binary sequence value of the 2D barcodes. In one embodiment, the binary sequence value obtaining module 607 may be carried out by software programs executed by the processor of the exemplary scanning device. The input of the binary sequence value obtaining module 607 may be the pixel values of the sampling points obtained from the sampling module 606, and the binary sequence value obtaining module 607 may output the binary sequence value of the 2D barcodes.

The processing module 608 is configured, after the binary sequence value obtaining module 607 obtains the binary sequence value of the 2D barcodes, to perform an error correction and decoding process on the binary sequence value of the 2D barcodes to obtain data contained in each barcode image of the 2D barcodes. In one embodiment, the processing module 608 may be carried out by software programs executed by the processor of the exemplary scanning device. The input of the processing module 608 may be the be the binary sequence value of the 2D barcodes obtained from the binary sequence value obtaining module 607, and the processing module 608 may output the data contained in each barcode image of the 2D barcodes.

As disclosed herein, the binarizing module 601 in the positioning module 501 in the scanning device can binarize an image to obtain a binary image. The barcode area determining module 602 can perform a dilation operation and an edge detection on the binary image to determine the barcode area corresponding to each 2D barcode contained in the binary image. Optionally, the type determining module 603 can obtain a positioning pattern contained in barcode area corresponding to the 2D barcode and to determine the type of the 2D barcode based on the positioning pattern.

Additionally, the correcting module 604 in the segmenting module 502 in the scanning device can correct the barcode area corresponding to each 2D barcode to obtain a corrected barcode area of the 2D barcode, according to a regional growth method. The area segmenting module 605 can then use a convex hull calculation method to segment out the barcode images corresponding to the 2D barcodes from the image according to the corrected barcode area of the 2D barcode.

Further, the sampling module 606 in the decoding module 503 in the scanning device can perform a grid sampling on each barcode image of the 2D barcodes to obtain pixel values of the sampling points. The binary sequence value obtaining module 607 obtains a binary sequence value of the 2D barcodes according to the pixel values of sampling points. The processing module 608 performs an error correction and decoding process on the binary sequence value of the 2D barcodes to obtain data contained in each barcode image of the 2D barcodes.

As disclosed herein, use of image binarizing process, dilation operation, and edge detection can effectively determine that the barcode area corresponding to each 2D barcode is included in the image and can correct the barcode area corresponding to each 2D barcode to obtain a corrected barcode area. The corrected barcode area can be processed by a regional growth method and a convex hull calculation to effectively segment each 2D barcode from the image. Further, a decoding process can be performed on each barcode image of the 2D barcode images corresponding to the 2D barcodes. This effectively realizes batch scanning and recognition of a plurality of 2D barcodes and simplifies scanning and recognition operations of 2D barcodes. This also saves operation time and increases operation efficiency.

It should be noted that, in the present disclosure each embodiment is progressively described, i.e., each embodiment is described and focused on difference between embodiments. Similar and/or the same portions between various embodiments can be referred to with each other. In addition, exemplary apparatus is described with respect to corresponding methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and devices. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

As disclosed herein, by using the 2D barcode positioning process to determine a barcode area corresponding to each 2D barcode of a plurality of 2D barcodes in an image, the plurality of 2D barcodes can be sequentially segmented to obtain a plurality of barcode images corresponding to the plurality of 2D barcodes. Each barcode image of the plurality of barcode images can be decoded to obtain data contained in each barcode image. This effectively realizes batch scanning and recognition of a plurality of 2D barcodes and simplifies scanning and recognition operations of 2D barcodes. This also saves operation time and increases operation efficiency.

As also disclosed herein, use of image binarizing process, dilation operation, and edge detection can effectively determine that the barcode area corresponding to each 2D barcode is included in the image and can correct the barcode area corresponding to each 2D barcode to obtain a corrected barcode area. The corrected barcode area can be processed by a regional growth method and a convex hull calculation to effectively segment each 2D barcode from the image. Further, a decoding process can be performed on each barcode image of the 2D barcode images corresponding to the 2D barcodes. This effectively realizes batch scanning and recognition of a plurality of 2D barcodes and simplifies scanning and recognition operations of 2D barcodes. This also saves operation time and increases operation efficiency.

What is claimed is:

1. A method for batch scanning 2D barcodes comprising:
in an image containing a plurality of 2D barcodes, using a 2D barcode positioning process, determining a barcode area corresponding to each 2D barcode of the plurality of 2D barcodes;
according to the barcode area corresponding to the each 2D barcode, segmenting the image containing the plurality of 2D barcodes, obtaining a plurality of barcode images with each barcode image corresponding to one 2D barcode of the plurality of 2D barcodes; and
decoding the each barcode image of the plurality of barcode images corresponding to the plurality of 2D barcodes, obtaining data contained in the each barcode image;
wherein the segmenting of the image containing the plurality of 2D barcodes, obtaining the plurality of 2D barcode images comprises:
according to a regional growth method, correcting the barcode area based on the each segmented barcode image corresponding to the each 2D barcode, obtaining a corrected barcode area of the each 2D barcode; and
using a convex hull calculation method, according to the corrected barcode area of the each 2D barcode, segmenting out the plurality of barcode images corresponding to the plurality of 2D barcodes from the image.

2. The method of claim 1, wherein the using of the 2D barcode positioning process, determining the barcode area corresponding to the each 2D barcode comprises: binarizing the image, obtaining a binary image; and performing a dilation operation and an edge detection on the binary image, determining the barcode area corresponding to the each 2D barcode contained in the image.

3. The method of claim 1, wherein the using of the 2D barcode positioning process, determining the barcode area corresponding to the each 2D barcode further comprises:
obtaining a positioning pattern contained in the barcode area corresponding to the each 2D barcode; and determining a type of the each 2D barcode based on the positioning pattern.

4. The method of claim 1, wherein the decoding of the each barcode image of the plurality of barcode images corresponding to the plurality of 2D barcodes, obtaining the data contained in the each barcode image comprises:
performing a grid sampling on the each barcode image of the plurality of 2D barcode images corresponding to the plurality of 2D barcodes, obtaining pixel values of sampling points;
according to the pixel values of the sampling points, obtaining a binary sequence value of the plurality of 2D barcodes; and performing an error correction and a decoding process on the binary sequence value of the plurality of 2D barcodes, obtaining data contained in the each barcode image of the plurality of 2D barcode images corresponding to the plurality of 2D barcodes.

5. The method of claim 1, before the step of using the 2D barcode positioning process, further comprising:

obtaining the image from at least one of a scanning, a photo gallery, a photo album, and a photo stream.

6. A device for batch scanning 2D barcodes, comprising one or more processors and a plurality of program modules executed by the one or more processors, the plurality of program modules comprising:

a positioning module, configured, in an image containing a plurality of 2D barcodes, using a 2D barcode positioning process, determining a barcode area corresponding to each 2D barcode of the plurality of 2D barcodes;

a segmenting module, configured to segment the image containing the plurality of 2D barcodes, obtaining a plurality of 2D barcode images with each barcode image corresponding to one 2D barcode of the plurality of 2D barcodes, after the positioning module determines the barcode area and according to the determined barcode area corresponding to the each 2D barcode; and a decoding module, configured to decode the each barcode image of the plurality of 2D barcode images corresponding to the plurality of 2D barcodes, obtaining data contained in the each barcode image, after the segmenting module obtains the plurality of 2D barcode images;

wherein the segmenting module comprises:

a correcting module, configured to correct the barcode area based on the each segmented barcode image corresponding to the each 2D barcode, obtaining a corrected barcode area of the each 2D barcode according to a regional growth method;

and an area segmenting module, configured to use a convex hull calculation method, according to the corrected barcode area of the each 2D barcode, segmenting out the barcode images corresponding to the plurality of 2D barcodes from the image.

7. The device of claim 6, wherein the positioning module comprises:

a binarizing module, configured to binarize the image, obtaining a binary image; and a barcode area determining module, configured to perform a dilation operation and an edge detection on the binary image, determining the barcode area corresponding to the each 2D barcode contained in the image.

8. The device of claim 6, further comprising:

a type determining module, configured to obtain a positioning pattern contained in the barcode area corresponding to the each 2D barcode and to determine a type of the each 2D barcode based on the positioning pattern.

9. The device of claim 6, wherein the decoding module comprises: a sampling module, configured to perform a grid sampling on the each barcode image of the plurality of 2D barcodes, obtaining pixel values of sampling points;

a binary sequence value obtaining module, configured to obtain a binary sequence value of the plurality of 2D barcodes according to the pixel values of the sampling points; and a processing module, configured to perform an error correction and decoding process on the binary sequence value of the plurality of 2D barcodes, obtaining data contained in the each barcode image of the plurality of 2D barcodes.

10. The device of claim 6, wherein the image is obtained from at least one of a scanning, a photo gallery, a photo album, and a photo stream.

11. A non-transitory computer-readable medium having computer program for, when being executed by a processor, performing a method for batch scanning 2D barcodes, the method comprising:

in an image containing a plurality of 2D barcodes, using a 2D barcode positioning process, determining a barcode area corresponding to each 2D barcode of the plurality of 2D barcodes;

according to the barcode area corresponding to the each 2D barcode, segmenting the image containing the plurality of 2D barcodes, obtaining a plurality of barcode images with each barcode image corresponding to one 2D barcode of the plurality of 2D barcodes; and decoding the each barcode image of the plurality of barcode images corresponding to the plurality of 2D barcodes, obtaining data contained in the each barcode image;

wherein the segmenting of the image containing the plurality of 2D barcodes, obtaining the plurality of 2D barcode images comprises:

according to a regional growth method, correcting the barcode area based on the each segmented barcode image corresponding to the each 2D barcode, obtaining a corrected barcode area of the each 2D barcode; and using a convex hull calculation method, according to the corrected barcode area of the each 2D barcode, segmenting out the plurality of barcode images corresponding to the plurality of 2D barcodes from the image.

12. The non-transitory computer-readable medium of claim 11, wherein the using of the 2D barcode positioning process, determining the barcode area corresponding to the each 2D barcode comprises:

binarizing the image, obtaining a binary image; and performing a dilation operation and an edge detection on the binary image, determining the barcode area corresponding to the each 2D barcode contained in the image.

13. The non-transitory computer-readable medium of claim 11, wherein the using of the 2D barcode positioning process, determining the barcode area corresponding to the each 2D barcode further comprises:

obtaining a positioning pattern contained in the barcode area corresponding to the each 2D barcode; and determining a type of the each 2D barcode based on the positioning pattern.

14. The non-transitory computer-readable medium of claim 11, wherein the decoding of the each barcode image of the plurality of barcode images corresponding to the plurality of 2D barcodes, obtaining the data contained in the each barcode image comprises:

performing a grid sampling on the each barcode image of the plurality of 2D barcode images corresponding to the plurality of 2D barcodes, obtaining pixel values of sampling points;

according to the pixel values of the sampling points, obtaining a binary sequence value of the plurality of 2D barcodes; and performing an error correction and a decoding process on the binary sequence value of the plurality of 2D barcodes, obtaining data contained in the each barcode image of the plurality of 2D barcode images corresponding to the plurality of 2D barcodes.

15. The non-transitory computer-readable medium of claim 11, wherein the image is obtained from at least one of a scanning, a photo gallery, a photo album, and a photo stream.

* * * * *